Oct. 22, 1929.                N. K. NIELSEN                1,732,585
                          GARAGE DOOR OPENING DEVICE
                            Filed April 19, 1928         2 Sheets-Sheet 1
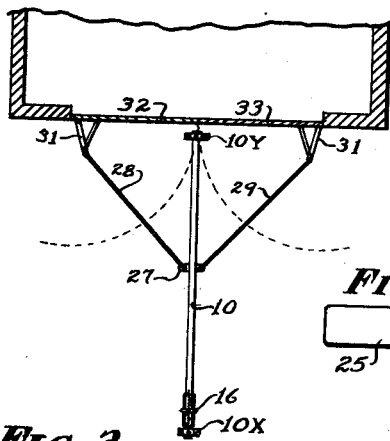
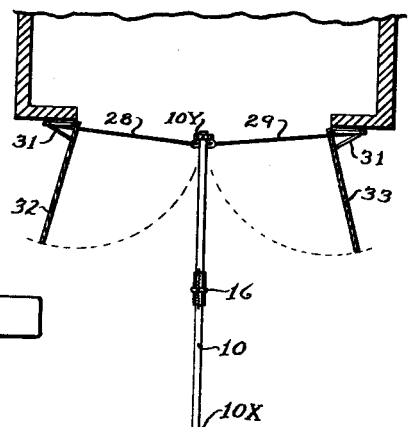
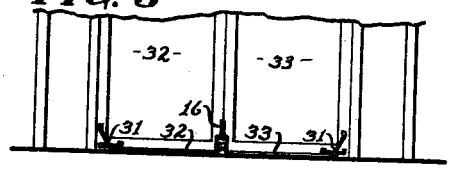
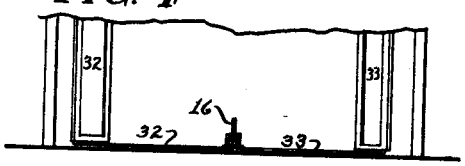
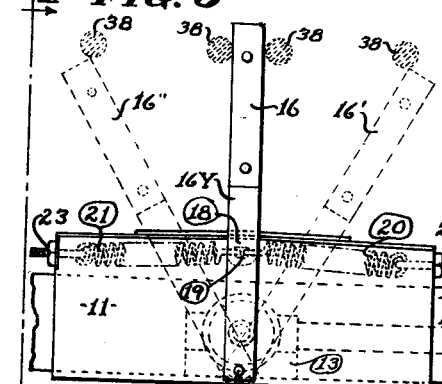
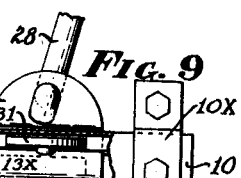
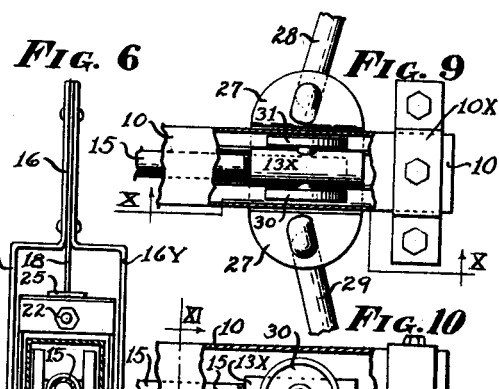
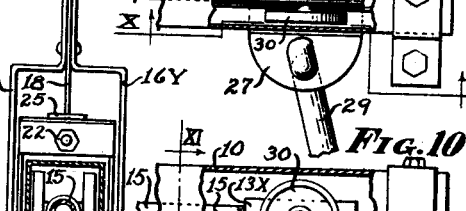
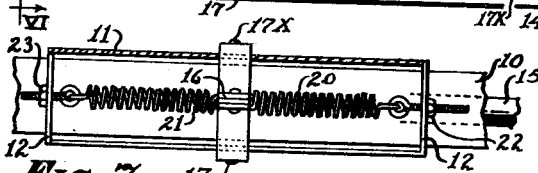
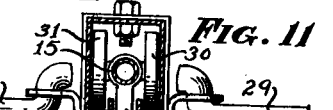
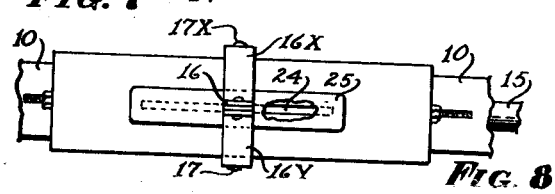
INVENTOR.
Niels K. Nielsen
BY
William C. Edwards Jr.
ATTORNEY.

Oct. 22, 1929.  N. K. NIELSEN  1,732,585
GARAGE DOOR OPENING DEVICE
Filed April 19, 1928    2 Sheets-Sheet 2
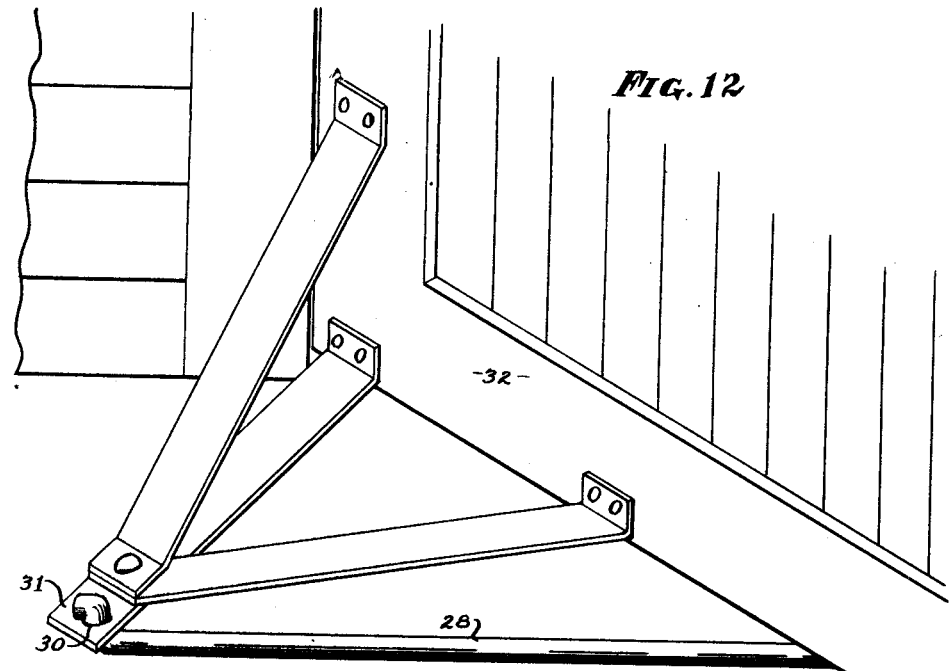
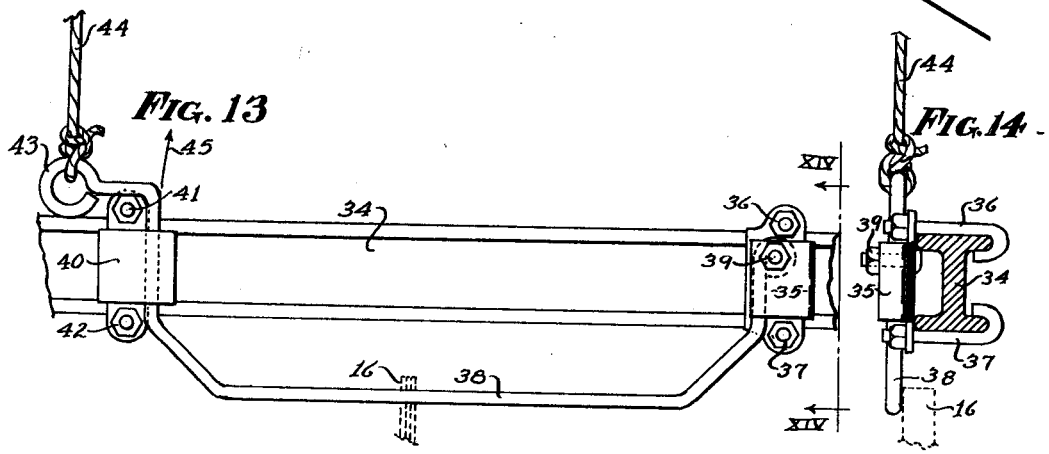
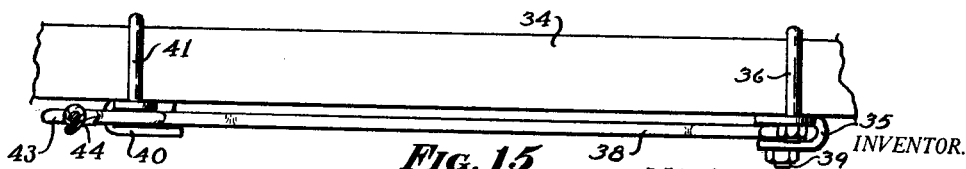
INVENTOR.
Niels K. Nielsen
BY
William C. Edwards Jr.
ATTORNEY.

Patented Oct. 22, 1929

1,732,585

UNITED STATES PATENT OFFICE

NIELS K. NIELSEN, OF WICHITA, KANSAS

GARAGE-DOOR-OPENING DEVICE

Application filed April 19, 1928. Serial No. 271,248.

The invention relates to an improved mechanism for opening and closing the doors of a garage by a combination of associated elements operable by the movements of the ingoing or outgoing automobile. In the usual practise, the driver of the automobile goes to the garage and opens the garage doors, then he backs out of the garage, next climbs out of the automobile and closes the doors; again he gets into the automobile and drives away. Upon his return, he gets out of the automobile and opens the garage doors, climbs back into the automobile and drives into the garage, then climbs out and closes the doors as he leaves the garage. By means of my invention he opens the doors to go in, the automobile while backing out closes the doors, and on its return opens the doors and the driver simply closes the doors as he leaves the garage. This procedure is effected by employing a track with elements associated therewith operating through rod and bracket means attached to the doors and driven by means carried upon the front axle of the automobile. The means and procedure will be more fully understood by referring to the drawings, in which Fig. 1 shows a fragmentary plan view of the garage with its doors and the mechanism of the invention associated therewith. Fig. 2 is similar to Fig. 1, the doors being shown in their opened relationship. Fig. 3 is a front elevation of Fig. 1. Fig. 4 is a front elevation of Fig. 2. Fig. 5 is an enlarged detailed side view of the trip mechanism, seen in Figs. 1 and 2. Fig. 6 represents a view taken along the line VI—VI in Fig. 5. Fig. 7 is a plan view of Fig. 5 with the cover element removed. Fig. 8 is a plan view of Fig. 5. Fig. 8ª is a detail view of the covering plate. Fig. 9 is an enlarged detail view of the connections, seen in Figs. 1 and 2, connecting the doors to the movable element on the track assembly. Fig. 10 is a view taken along the line X—X in Fig. 9. Fig. 11 is a view taken along the line XI—XI in Fig. 10. Fig. 12 is a perspective view of a garage jamb and door assembly, showing the bracket on the door and the rod connecting thereto for door operating purposes. Fig. 13 is an elevation of the back side of an automobile front axle with the trip engaging rod in operative position. Fig. 14 is a view taken along the line XIV—XIV in Fig. 13. Fig. 15 is a plan view of Fig. 13. Similar numerals of reference indicate corresponding parts throughout all the figures of the drawings.

At 10 is seen a track element secured by brackets at 10ˣ and 10ʸ to the driveway forward of the garage and being centrally positioned between the door jambs without the garage. This track is of the usual type used for sliding doors on barns and the like. A housing 11 is closed at each end as at 12. Within the housing 11 is an element 13 which is mounted upon paired wheels 14 operable upon the track 10. A pipe 15 screws into the member 13. A member 16 as an inverted yoke provided with the side elements 16ˣ and 16ʸ pivotally engaging at 17 and 17ˣ upon pins projecting from the housing 11 has a tongue element 18 rigidly affixed as disclosed in Fig. 6 between the portions 16ˣ and 16ʸ of the member 16 and extending into the housing 11 for a distance and having a hole at 19 into which engage the paired springs 20 and 21, adjustably tensioned by the adjusting nuts 22 and 23 against the ends 12 as seen in Fig. 5. In the top of the housing 11 is a slot 24 within which the member 18 is adapted to work. Over the slot 24 is placed a plate 25 as a covering element therefor and provided with a hole 26 to pass the arm 18; when the arm 18 is moved to either of the dotted positions as indicated by the positions of the member 16 at 16′ or 16″, the plate 25 moves with it, but serving always as a cover for the slot 24. The pipe 15 spans between the element 13 seen in Fig. 5 to the element 13ˣ, which is similar to the element 13 but arranged within the track 10 at a distance towards the garage. Upon the base of the element 13ˣ is rigidly affixed a plate 27 which is provided with two holes, one on either side thereof into which engage the rods 28 and 29 as seen in Fig. 9. The element 13ˣ is mounted upon the paired wheels 30 and 31 which travel in the track 10 in keeping with movements of the wheels 14. Upon either garage door is attached a bracket such as seen at 31 as applied to the exterior of the door 32 at the base thereof and near the door jamb. The door 33 has a similar assembly for the rod 29. The rods 28 and 29 engaging their proper bracket 31 by means of a hooked end passing the hole 30 of the bracket.

At 34 is shown the front axle of the automobile to which a U-shaped member 35 is bolted by the hook bolts 36 and 37 and in this member 35 is a rod 38 pivotally mounted upon the pin 39. The rod 38 is bent as seen in Fig. 13. The left hand end fits within a U-shaped guide 40, also rigidly attached to the axle 34 by means of two bolts 41 and 42. An eye 43 is formed on the rod 38 in which is fastened a cord or cable 44, which leads to any convenient position accessible to the operator of the automobile and whereby the operator can pull upon the cord 44 so that the rod 38 will swing upwardly in the direction of the arrow 45. In this raised position the rod 38 will not strike or catch upon high points in the road during road travel of the automobile.

Upon the return of the automobile to the garage, the doors being closed as in Fig. 1, the member 16 is positioned in a vertical position at the forward end of the track 10. The driver of the car loosens the cable 44 which allows the rod 38 to drop down to the position seen in Fig. 13 or so that it will strike the upper end of the member 16; then as the automobile moves towards the garage, the assembly 16—13—15—13$^x$ moves with it being forced by the rod 38. This movement causes the rods 28 and 29 to move from the position seen in Fig. 1 to the position seen in Fig. 2 which operates to push against the brackets 31 of the doors 32 and 33 or so that they stand open as in Fig. 2. By this time the part 13$^x$ has moved to and against the bracket 10$^y$. The spring tension 21 is sufficient up to this point to hold the part 16 in engagement with the rod 38 but now the part 16 moves to the position 16' and the member 38 passes over the top of the member 16 and the automobile moves on into the garage. The driver steps out of the automobile, next closes the doors 32 and 33. When he next opens the doors to remove the automobile, the mechanism stands as seen in Fig. 2; now the procedure is reversed, the rod 38 now strikes the member 16 and as the automobile backs out of the garage, the pipe 15 moves in its track 10 till the part 13 comes to the end bracket 10$^x$ when the spring 20 stretches to allow the member 16 to take the dotted position 16" and the rod 38 passes over the top of the bar 16 and in this position the doors 32 and 33 are closed again as in Fig 1.

Such modifications may be employed as lie within the scope of the appended claims. Having fully described my invention, what I now claim as new and desire to secure by Letters Patent is:

1. In a device for opening and closing garage doors adapted to be actuated by means of a moving automobile; a stationary track attached to the ground position forwardly extending from the garage; a movable element for said track having wheels carrying elements at either end of a pipe member; one of said elements carrying a spring controlled striker pivotally attached thereto, the other element having a pair of rods flexibly connecting thereto; and brackets upon the garage doors flexibly connecting to said rods.

2. In a device as described in claim 1; and a rod supported from an automobile axle adapted to strike the striker and move the carriage element for opening or closing said doors as desired.

3. In a device of the class described; a track affixed to the ground level, by securing means at either end thereof; a pipe on a movable carriage within the track; a striker at one end of the pipe and flexibly connecting rods at the other end of said pipe.

4. In a device of the class described, a track, a housing, an element within the housing rigid thereto, wheels supporting said element for track travel and a striker hingedly attached to the housing and spring means for supporting said striker in operative positions as desired and a pipe connecting said element to a second element similarly wheel supported at a distance therefrom in said track; and rod means flexibly connected to the second element.

In testimony whereof I affix my signature.
NIELS K. NIELSEN.